United States Patent [19]

Chapman

[11] Patent Number: 5,526,323
[45] Date of Patent: Jun. 11, 1996

[54] METHOD AND APPARATUS FOR INTERPRETATION OF SONAR SIGNALS

[75] Inventor: Robert M. Chapman, Groton, Conn.

[73] Assignee: General Dynamics Corporation, Groton, Conn.

[21] Appl. No.: 491,513

[22] Filed: Sep. 28, 1965

[51] Int. Cl.$^6$ ........................................ G01S 15/00
[52] U.S. Cl. .............................. 367/135; 367/901
[58] Field of Search ........... 340/3, 5, 6; 324/77 A–77E; 367/131, 901, 135

[56] References Cited

U.S. PATENT DOCUMENTS 2,368,953  2/1945  Walsh .
2,487,135  11/1949  Herrnfeld .
3,054,053  9/1962  Cook .

OTHER PUBLICATIONS

Bennett, Proc. of the IRE, vol. 36, pp. 906–907 Jun. 1948.
Cron et al., J. of the Acous. Soc. of America, vol. 37 Mar. 1965.

Primary Examiner—Daniel T. Pihulic
Attorney, Agent, or Firm—Brumbaugh, Graves, Donohue & Raymond

[57] ABSTRACT

In the particular embodiment of the invention described herein, sonar signals in the range from 200–3600 cps. are analyzed by bandshifting selected segments of 100 cps. width to the range 300–400 cps. for analysis, and indications of signals in all of the bands are presented side-by-side on a continuous printer. in addition, the modulation envelope of the detected signal, which contains low frequency modulation components, is demodulated to provide indications of such low frequency components in a target signal.

9 Claims, 3 Drawing Sheets

METHOD AND APPARATUS FOR INTERPRETATION OF SONAR SIGNALS

The invention herein described was made in the course of a contract with the U.S. Navy.

SPECIFICATION

This invention relates to the processing of sonar signals and the like emanating from a remote object such as a submarine and, more particularly, to a new and improved system for processing such signals by which positive identification and classification of the remote object is facilitated.

Heretofore, the most extensively used technique for classification of objects detected by sonar apparatus has been the trained memory of the operator of the sonar apparatus. For this purpose, operators of sonar apparatus require an extensive training program in the character of sounds received from many different types of targets and, in practice, the decision on identification of an object detected by sonar signals is based upon the opinion of the operator. The reliability of the classification, therefore, is completely dependent on the memory, aural acuity, experience, and training of the operator.

Furthermore, present submarine sonar classification systems operate in the very low frequency region in which substantial interference from noise sources within the submarine is encountered. Moreover, existing classification systems require the installation of special hydrophone arrays extending along a substantial length of the hull of the submarine and also necessitate turning of the entire submarine in order to steer the array and obtain a measure of directivity.

Accordingly, it is an object of the present invention to provide a new and improved system for interpreting sonar signals which overcomes the abovementioned disadvantages of present systems.

Another object of the invention is to provide a method for interpreting sonar signals whereby signal characteristics inherently indicating the target classification are utilized.

A further object of the invention is to provide an apparatus for analyzing sonar signals which is capable of presenting signal characteristics which are uniquely representative of given target types.

These and other objects of the invention are attained by comparing signals detected in an intermediate frequency range with a selected portion of the demodulated signal envelope. More particularly, the ratio of signals in two frequency ranges are detected and compared with the frequency ratios of known objects. Moreover, this is accomplished without detecting interfering low frequencies by demodulating the received signals to produce the complex modulation wave form of the signal envelope and then analyzing the demodulated signal by frequency.

In accordance with the invention, moreover, a bandshift modulator is provided to shift selected segments of the received signal in the region from about 200 cps. to about 5,000 cps. to the frequency range of a narrow band analyzer. Also, an audio range demodulator is arranged to produce the modulation wave of the signal above 200 cps. and to provide signals below 200 cps. representing the low frequency components which are then analyzed by the narrow band analyzer.

Further objects and advantages of the invention will be apparent from a reading of the following description in conjunction with the accompanying drawings, in which.

Figure 1:
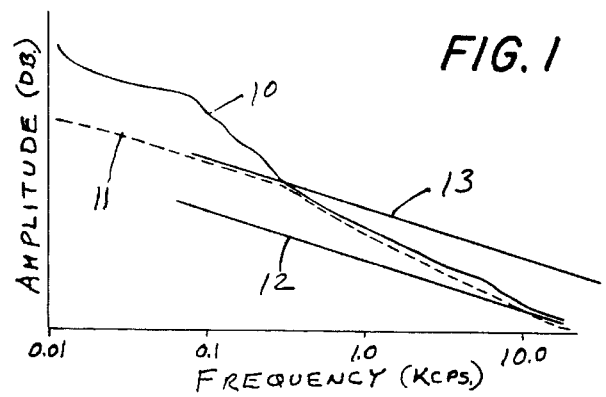
FIG. 1 is a graphical representation of a typical background noise spectrum detected by the sonar apparatus of a present-day submarine.

In the graphical illustration of FIG. 1, the total background noise spectrum detected by the sonar apparatus in a typical submarine is represented by the curve designated 10, while the dashed line 11 represents the natural noise of the sea. The parallel lines 12 and 13 designate the noise levels generally known as Sea State No. 0 and Sea State No. 1, respectively. It will be observed from FIG. 1 that the region below 200 cps. is characterized by a very high submarine self-noise level, whereas above 200 cps. the background noise is generally limited by the natural noise of the sea which usually falls between the levels corresponding to Sea State No. 0 and Sea State No. 1.

Figure 2:
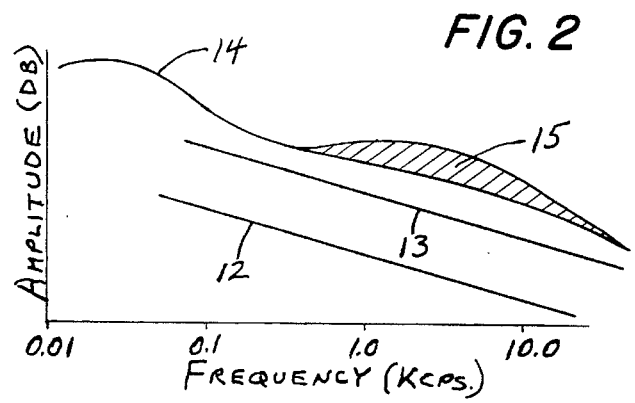
FIG. 2 is a graphical representation of a typical noise spectrum including signals radiated by a moving submarine or other target.

Sonar targets under way introduce variations in the received sonar signal spectrum. As represented by the solid line 14 of FIG. 2, the amplitude of the signals in the region above about 600 cps. increases with increasing target speed and, moreover, that region is modulated with additional signal components resulting from target noise as indicated by the shaded area 15 in FIG. 2. This is the sound that is usually detected and classified by sonar operators.

In accordance with the present invention, certain characteristics of the target self-noise which are inherent in the type of target detected are utilized to provide positive target classification. To this end, the target noise area from 200 cps. to 3,600 cps. is bandshifted segment by segment to the frequency range of a narrow band frequency analyzer to determine its principal frequency components in the range from 200 cps. to 3,600 cps., the portion of the spectrum below 200 cps. being eliminated to avoid interfering submarine self-noise. In the region from 200 cps. to 3,600 cps., signals resulting from characteristic components of the target's propulsion system, such as reduction gear whine, motor slot noise, supercharging whine, and singing screw noise, will be detected.

In most instances, however, the signals detected in the range from 200 cps. to 3,600 cps. will vary in frequency according to the speed of the target and, consequently, cannot provide positive target identification. To overcome this problem in accordance with the present invention, the target noise spectrum 15 is also demodulated to produce the complex wave form of the target noise envelope which will include low frequency noise components representative of the propeller shaft speed. The frequencies of these low frequency components, which represent, for example, the propeller blade rate, will bear a certain fixed relation to the frequencies of the high frequency components depending upon the structural and mechanical characteristics of the target, which are independent of its operating speed. By comparing the detected frequency ratios with the known mechanical characteristics of all probable targets, therefore, target classification can be accomplished with maximum accuracy. Furthermore, because the low frequency components of the target noise are detected as modulation components of a high frequency signal, the interference usually resulting from self-noise, which normally prevents analysis of low frequency target noise signals, is eliminated.

Figure 3:
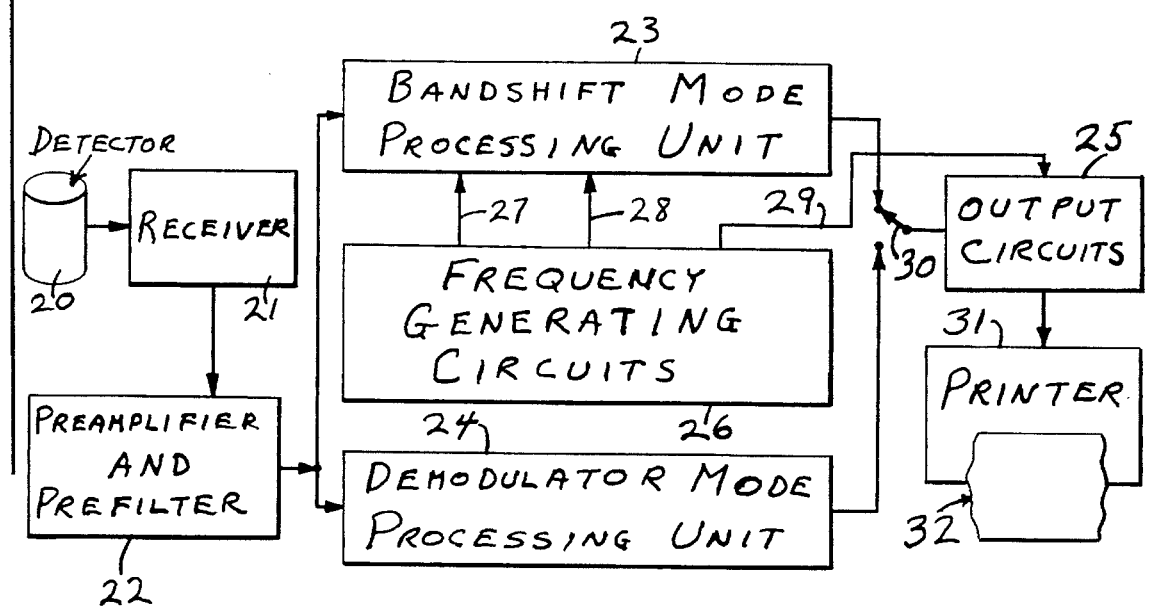
FIG. 3 is a schematic block diagram illustrating the arrangement of a representative apparatus for interpreting sonar signals according to the invention.

In the representative apparatus for carrying out the invention shown in the block diagram of FIG. 3, a sonar detector 20, which may be any of the usual hydrophone arrangements, detects sonar signals and transmits them to a receiver 21, which may also be any of the conventional sonar receiver systems that are usually provided. A preamplifier and prefilter unit 22 amplifies the received sonar signal and may be set to eliminate all frequency components below 200 cps. so as to remove the submarine self-noise.

The sonar signal is then applied to a bandshift mode processing unit 23 and a demodulator mode processing unit 24, each of which is described in greater detail hereinafter. Briefly, the bandshift mode unit 23 is arranged to selectively shift any 100 cycle segment of the frequency range 200 cps. to 3,600 cps. to the range 300 cps. to 400 cps. for narrow band analysis by the output circuits 25, which are also described in greater detail hereinafter. For this purpose, a frequency generating circuits unit 26 supplies a plurality of selected heterodyne frequencies through two cables 27 and 28 to the bandshift unit 23 and also through a cable 29 to the output circuits unit 25. The demodulator mode processing unit 24, on the other hand, demodulates the received sonar signal to produce the complex target noise modulation envelope and the components of the target noise signal below 200 cps., as represented by the modulation envelope of higher frequency components, are also applied to the output circuits unit 25, a switch 30 being arranged to selectively transmit either the bandshift mode signal or the demodulator mode signal to the output circuits.

Finally, to facilitate analysis, a printer 31 receives the analyzed signals from the output circuits representing according to the position of the switch 30 either the sonar signal frequencies in a selected segment within the range from 200 cps. to 3,600 cps. which have been bandshifted for analysis or the demodulated target noise signals. The signal representations on the sheet 32, which is produced by the printer, may be readily compared so as to determine accurately the ratios between the low frequency components and the high frequency components which will thereby provide positive target classification.

Figure 4:
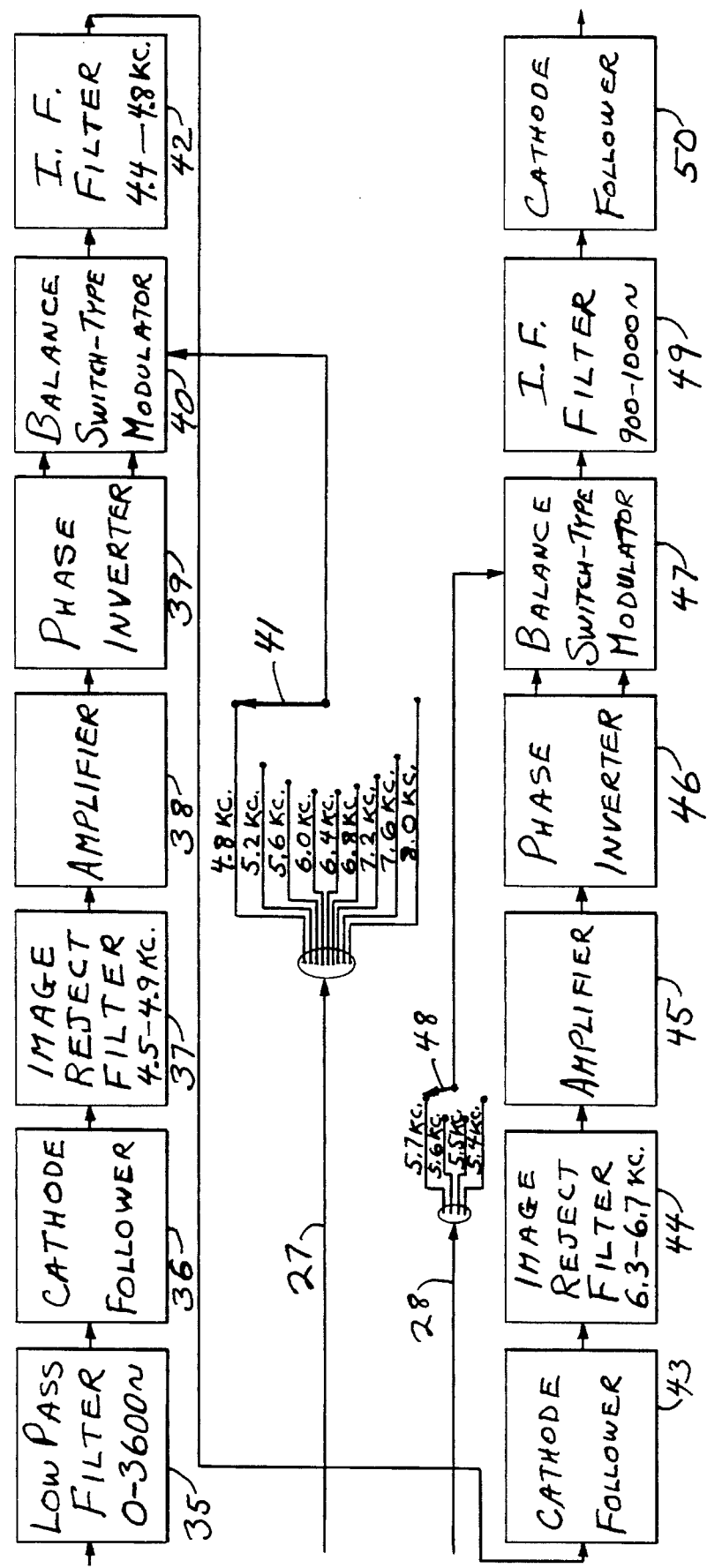
FIG. 4 is a schematic block diagram illustrating the arrangement of a typical bandshift mode processing unit for use in apparatus of the type shown in FIG. 3.

Within the bandshift mode processing unit as shown in FIG. 4, a low pass filter 35 receives the signal from the preamplifier and transmits the frequencies up to 3,600 cps. by way of a cathode follower 36 to an image reject filter 37. This filter completely eliminates all signals in the range 4.5 kc. to 4.9 kc. so that the only signals passed by the first intermediate frequency stage will be the intended heterodyned signals. The signals are then amplified by an amplifier 38 and transmitted to a dual output phase inverter 39 from which both phases are applied to a balance switch-type modulator 40.

The modulator 40 also receives a selected one of nine constant frequency signals supplied through the cable 27 from the frequency generating circuits, the selection being made by a switch 41 in accordance with a particular 400 cycle band of the sonar signal which is being investigated. As shown in FIG. 4, the constant frequency signals from the cable 27 range in 400 cycle steps from 4.8 kc. to 8.0 kc. and inasmuch as the output from the modulator 40 is applied to an intermediate frequency filter 42 arranged to pass the 4.4 kc. to 4.8 kc. band, it will be apparent that the output of the first intermediate frequency stage will be a selected band of 400 cycles in the range from 0 to 3,600 cps. which has been transferred to the 4.4 kc. to 4.8 kc. band. Inasmuch as the frequency components below 200 cps. have been eliminated by the prefilter 22, the 0–400 cps. band will, of course, contain only frequency components in the 200–400 cps. range.

This signal is, in turn, passed through a cathode follower 43 to a second image reject filter 44 which completely eliminates frequencies in the range from 6.3 kc. to 6.7 kc. so as to avoid any spurious output signals from the second intermediate frequency stage. Thereafter, the signal is again passed through an amplifier 45 and a dual output phase inverter 46 to another balance switch-type modulator 47 to which a selected one of four constant frequency signals supplied through the cable 28 is also applied. The latter signals have frequencies of 5.4 kc., 5.5 kc., 5.6 kc., and 5.7 kc., respectively, and are selected by a switch 48 for application to the modulator 47. Accordingly, the filter 49 following the modulator 47, which passes a 100 cycle band in the range from 900 cps. to 1,000 cps., produces any selected 100 cycle segment of the 400 cycle band passed by the first filter 42, depending upon the position of the switch 48. A cathode follower output 50 transmits this 900 cps. to 1,000 cps. signal to the output circuits 25 by way of the switch 30 (FIG. 3).

Figure 5:
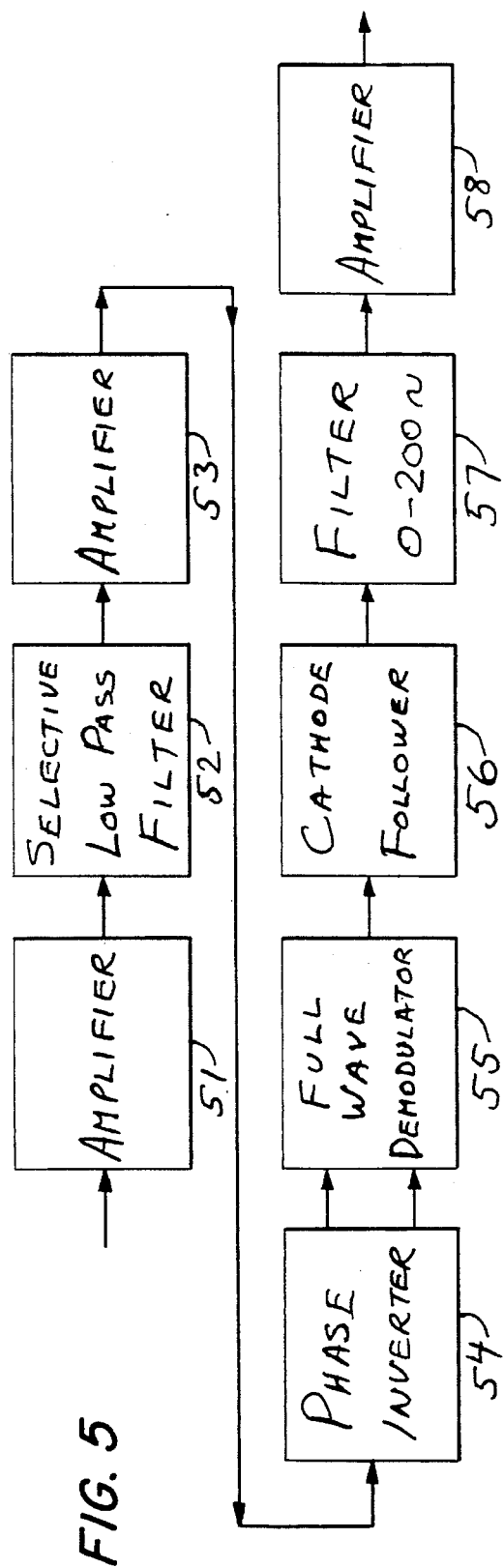
FIG. 5 is a schematic block diagram illustrating the arrangement of a typical demodulator mode processing unit for use in apparatus of the type shown in FIG. 3.

In the demodulator mode processing unit shown in detail in FIG. 5, the signal from the preamplifier 22 (FIG. 3) is transmitted by an amplifier 51 to a selective low pass filter 52 which may be set to pass signals in the range from 200 cps. to 800 cps. or in the range from 400 cps. to 4,000 cps. to a further amplifier 53. Alternatively, the low pass filter may be rendered inactive so that all signals above 200 cps. are transmitted. Thereafter, a phase inverter 54 provides signals of opposite phase to a full wave demodulator 55 so as to produce the target noise modulation envelope of the received sonar signal. A cathode follower 56 transmits the target noise signal to a low pass filter 57 which eliminates signals above 200 cps. and passes the low frequency signals to an amplifier 58 for transmission to the output circuits unit 25 by way of the switch 30 (FIG. 3).

Figure 6:
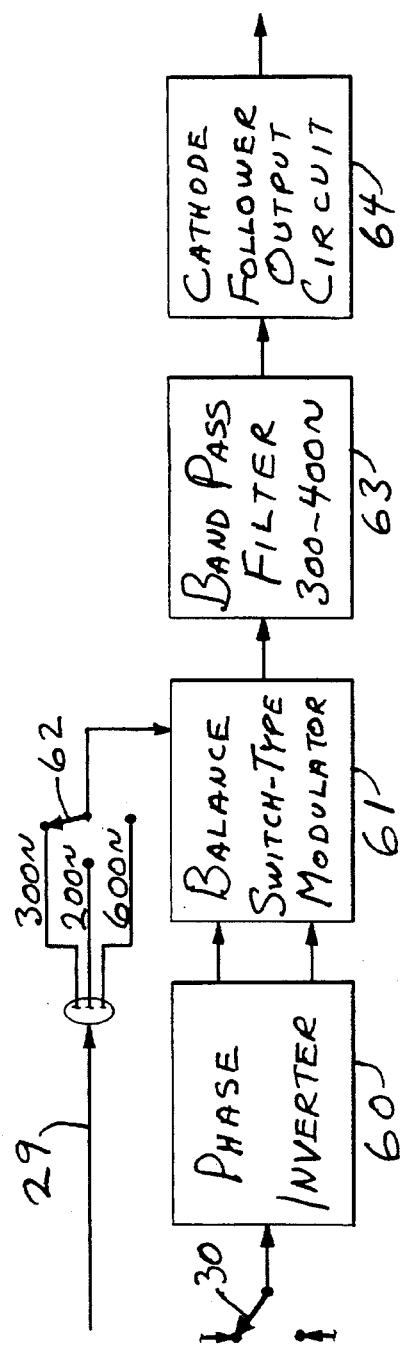
FIG. 6 is a schematic block diagram illustrating a representative output circuit arrangement for the apparatus shown in FIG. 3.

The output circuits shown in detail in FIG. 6 include a phase inverter 60 which applies the signal selected by the switch 30 to a balance switch-type modulator 61. A switch 62 connected to the modulator 61 is arranged to select any of three frequencies 200 cps., 300 cps., or 600 cps. from the cable 29 for application to the modulator so as to transfer the signals applied thereto to the range of 300 cps. to 400 cps. The signals are then relayed to the printer 31 (FIG. 3) by a cathode follower output circuit 64.

When the switch 30 is set to receive signals from the bandshift unit 23, which are supplied in the range 900 cps. to 1,000 cps., the switch 62 is set to apply a 600 cps. signal to the modulator 61. On the other hand, when the switch 30 transmits the demodulator mode signal to the output circuits, the switch 62 may be set either to apply the 300 cps. signal to the modulator, thereby converting the 0 to 100 cps. portion of the demodulator output signal to the 300 cps. to 400 cps. range, or it may be set to apply the 200 cps. signal so as to convert the 100 cps. to 200 cps. portion of the demodulator mode output signal to the 300 cps. to 400 cps. range.

From the modulator 61, the signal is conveyed through the 300 cps. to 400 cps. band pass filter 63 to the cathode follower 64 which transmits the signal to the printer 31. The printer is arranged to respond to signals in the range of 300 cps. to 400 cps. providing an output indicating the presence of signals having frequencies within that range. Accordingly, by proper positioning of the switches 30, 41, 48, and 62, the apparatus may be set to print out representations of received sonar signals within any 100 cycle band between 200 cps. and 3,600 cps. and also representations of demodulated target noise signals in the range from 0 to 100 cps. or in the range from 100 cps. to 200 cps.

In operation, with the switch 30 set to transmit bandshift mode signals to the output circuits and the switch 62 set at the 600 cps. position, the switches 41 and 48 are stepped through their various positions so as to select each 100 cycle band in the range from 0 to 3,600 cps. During this operation, the printer 31, which may also be arranged to provide indications of the switch positions so as to show the frequency range being analyzed, will print out all of the frequency components of the received sonar signal in the range from 0 to 3,600 cps. in the manner described above. It may, in certain instances, be desirable to include in this analysis low frequency signals in the range from 0 to 200 cps. for reference purposes or the like and, in such cases, the prefilter 22 is set to pass those signals.

The switch 30 is then set to transmit signals from the demodulator mode and the switch 62 is set first at the 300 cps. position to print out indications of the target noise signals in the range from 0 to 100 cps. and is then set at the 200 cps. position to print out indications of the target noise frequencies in the range from 100 cps. to 200 cps. Thereafter, the printed signal indications are compared to determine the characteristic ratios which will provide target classification information independent of the target speed in the manner described.

Although the invention has been described herein with reference to a specific embodiment, many modifications and variations thereof will readily occur to those skilled in the art. Accordingly, all such variations and modifications are included within the intended scope of the invention as defined by the following claims.

I claim:

1. A method for processing sonar signals comprising receiving a complex sonar signal including a target noise signal from a target, detecting a spectrum of frequency components of the complex sonar signal by bandshifting each of a plurality of segments therein to a selected frequency range, demodulating the complex sonar signal to separate the target noise signal, detecting frequency components of the target noise signal, and comparing the detected frequency components of the target noise signal with the detected frequency components of the complex sonar signal.

2. A method for processing sonar signals comprising a complex sonar signal including a target noise signal from a target, removing low frequency noise components from the complex sonar signal, detecting a spectrum of higher frequency components of the complex sonar signal by bandshifting each of a plurality of segments therein to a selected frequency range, demodulating the complex sonar signal to separate the target noise signal, detecting low frequency components of the target noise signal, and comparing the detected low frequency components of the target noise signal with the detected higher frequency components of the complex sonar signal.

3. A method for processing sonar signals comprising receiving a complex sonar signal including a target noise signal from a target, detecting a spectrum of frequency components between a first frequency and a second frequency of the complex sonar signal by bandshifting each of a plurality of segments therein to a selected frequency range, demodulating the complex sonar signal to separate the target noise signal, detecting frequency components of the target noise signal including components below the first frequency, and determining the ratio of the detected complex sonar signals and the target noise signal frequency components.

4. A method for processing sonar signals comprising receiving a complex sonar signal including a target noise signal from a target, detecting a spectrum of frequency components in the complex sonar signal above a selected frequency value by bandshifting each of a plurality of segments there into a selected frequency range, demodulating the complex sonar signal to separate the target noise signal, detecting frequency components in the target noise signal below the selected frequency value, determining the ratios of selected frequency components in the complex sonar signal to selected frequency components in the target noise signal, and comparing the ratios with known ratios to determine target classification.

5. Apparatus for processing sonar signals comprising demodulator means for separating the modulation envelope from a received sonar signal, and frequency analyzer means for determining the frequency components of the received sonar signal and of the separated modulation envelope, the frequency analyzer means comprising bandshift means for shifting selected frequency segments of the received signal to a selected frequency band.

6. Apparatus for processing sonar signals comprising receiver means for receiving a sonar signal from a target, analyzer means for analyzing the spectrum of the received signals over a selected frequency range greater than a predetermined value, demodulator means for separating the sonar signal modulation from the received signal in the selected frequency range, and means for applying the modulation signal to the analyzer for frequency analysis, the frequency analyzer means comprising bandshift means for shifting selected frequency segments of the received signal to a selected frequency band.

7. Apparatus for processing sonar signals comprising receiver means for receiving sonar signals from a target, bandshift means for shifting each of a plurality of selected frequency segments of the received signal between a first frequency and a second frequency to a given narrow frequency range for analysis, demodulator means for removing the modulation envelope of the received sonar signals, means for shifting selected segments of the modulation envelope including components having frequency below the first frequency to the given narrow frequency range for analysis, and analyzer means adapted to provide a frequency analysis of signals within the given narrow frequency range.

8. Apparatus for processing sonar signals comprising receiver means for receiving sonar signals from a target, filter means for eliminating signal components having a frequency below a selected value, bandshift means for shifting selected frequency segments of the sonar signals having frequency between the selected value and a higher value to a predetermined frequency band, demodulator means for separating the modulation envelope of the sonar signals above the selected frequency, filter means for eliminating components of the modulation envelope signal having frequency greater than the selected frequency, bandshift means for shifting selected segments of the modulation envelope to the predetermined frequency band, and narrow band spectrum analyzer means for selectively analyzing the selected sonar signal segments and modulation envelope signal segments within the predetermined frequency band.

9. Apparatus for processing sonar signals comprising receiver means for receiving sonar signals from a target, filter means for eliminating signal components from the received sonar signal having frequencies below about 200 cps., bandshift means for shifting selected frequency segments of the received signal having frequency between about 200 cps. and about 3,600 cps. to a selected frequency band, demodulator means for removing the modulation envelope of the received sonar signal above about 200 cps., filter means for eliminating components of the modulation envelope signal having frequency greater than about 200 cps., bandshift means for shifting selected segments of the modulation envelope signal to the selected frequency band, and narrow band spectrum analyzer means for selectively analyzing the selected sonar signal segments and modulation envelope signal segments within the selected frequency band.

* * * * *